Dec. 13, 1960 P. J. ROMMEL 2,963,916
WHIRLING MIXERS
Filed July 13, 1955

INVENTOR:
PAUL J. ROMMEL
BY
Hoag, Kilburn & Carlson
ATTORNEYS:

United States Patent Office 2,963,916
Patented Dec. 13, 1960

2,963,916

WHIRLING MIXERS

Paul J. Rommel, 35—25 77th St., Jackson Heights, N.Y.

Filed July 13, 1955, Ser. No. 521,685

2 Claims. (Cl. 74—89)

This invention relates to the construction of a whirling mixer comprising a mixing or stirring member which is rotated first in one direction and then in the opposite direction at high speed by means of a reciprocating plunger.

An object of the invention is to provide such a device in which the moving members operate with a minimum of friction.

Another object is to provide such a device with means therein for trapping grease or other lubricant and preventing it from getting onto the exterior portion of the device.

Another object is to provide a device in which the operating parts are entirely sealed from liquid or other material into which the spoon is inserted.

Another object is to provide a device having a minimum of operating parts whereby a durable and economical product is provided.

The invention can best be understood if read in connection with the following drawings in which.

Figure 1:
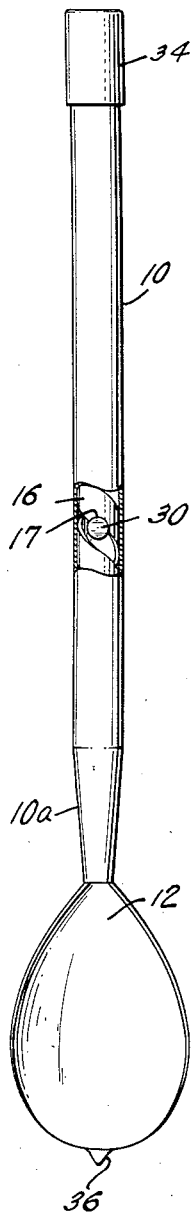
Figure 1 is a plan view of the device partly in section.
Figure 2:
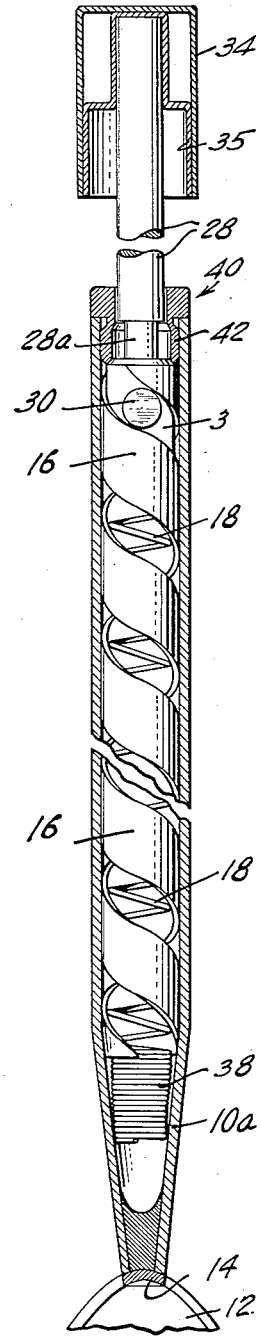
Figure 2 is a similar view largely in transverse section to show the operating parts.
Figure 3:
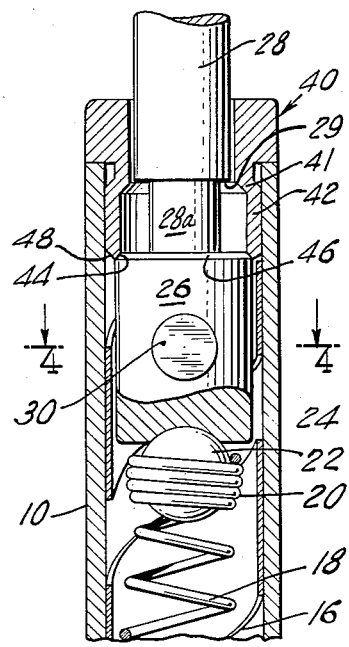
Figure 3 is an enlarged view of a portion of the device shown in Figure 2.
Figure 4:
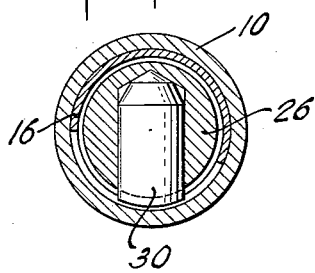
Figure 4 is a transverse section taken on the line 4—4 of Figure 3.

In the embodiment of the invention as disclosed herein the numeral 10 identifies a tubular hollow handle terminating at its lower end in the mixing or stirring member 12 which is illustrated in the form of a spoon bowl. The tubular handle is entirely sealed around its lower end at its interface 14 with the bowl portion 12.

Tightly fitting within tubular member 10 is the spiral member 16 which is a rigid member formed of metal or other durable rigid material, and within the spiral member 16 is the coil spring 18, the end portions of which are formed as will be described, and the intermediate portion of which comprises coils which approximate the inside diameter of the spiral member 16, but with enough space between themselves and the greased inside face of the spiral member to permit compression and expansion of the spring repeatedly and at high speed with a minimum of friction.

The coils comprising the upper portion of spring 18 decrease in diameter progressively to the upper end of the "live" portion of the spring where it joins a few turns which are given a permanent set to form a seat or cage 20 for a bearing member 22, shown herein as a ball bearing, but which may be a member with a pointed or conical top. The upper portion of ball bearing 22 is received in a concavity 24 in the lower end of head portion 26 of a plunger member 28 by which the spring 18 is alternately compressed, on the down stroke of the plunger, and expands to move the plunger through the up stroke and thereby return it to its initial position in preparation for another down stroke.

Projecting from head portion 26 of plunger 28 is the head portion of pin 30, which is also employed, if the head portion 26 is formed separately from the plunger 28, to fix the head portion on the plunger. The projecting end portion of pin 30 extends into the spiral track 32 defined by the member 16. It will be understood that a spiral track may be defined by spiral grooves on the inner surface of handle 10, but I prefer to use the separate member 16 for this purpose.

At the top of the plunger is a cap 34 having a downwardly extending flange portion 35 adapted to receive within it the upper end of tubular handle 10. A small pointed contact member 36 projects from the lower end of the bowl portion 12 and in use the device rests on the point of said member, as for example in a glass or other container for the liquid or other material to be mixed or whipped, the member 36 serving to provide a bearing on which the spoon bowl 12, the tubular handle 10, and the spiral 16 therein are rotated first in one direction and then in the other with successive up and down strokes of plunger 28.

The user may rest the palm of one hand on the cap 34, or may conveniently grasp cap 34 with the ends of fingers of one hand, with the contact point 36 resting on the bottom of the receptacle containing the liquid or other material to be mixed or stirred. The user alternately presses down on the plunger, thereby moving it through its down stroke, and releases the plunger, thereby permitting the spring to return the plunger to its elevated position, thereby performing the up stroke. In normal operation of the mechanism the plunger completes from 300 to 400 cycles per minute which means that the spring also is compressed and released from 300 to 400 times per minute.

The spiral member 16 adjacent its lower end is provided with a notch 17 forming a recess to receive the projecting head of pin 30. The notch is positioned so that pin 30 will enter it only when the plunger is moved downwardly to a predetermined position which, as illustrated, is its lowermost position. When this occurs the plunger will be locked within the handle and the device becomes a longhandled spoon. To release the projection 30 from notch 17 it is only necessary to twist cap 34 slightly thereby disengaging the projection from notch 17.

A device of this general kind is disclosed in Patent 2,111,407. This application is directed to improvements in the device disclosed in said patent whereby quieter and easier operation is attained with less friction between operating parts; whereby the exterior surfaces of the device are protected from grease working out from the operating parts within the handle; and whereby the operating parts within the handle are sealed off and protected, thereby also protecting the material being stirred or mixed from contamination by material previously accumulated within the handle, such as might be the case if the interior of the handle were not effectively sealed.

In the device disclosed in said patent a cup with a downwardly extending stem was inserted in the top of the spring to provide a seat for a ball bearing which was staked into the bottom end of the plunger head, or was free in the cup. A free ball was found undesirable because when the plunger was disassembled from the handle the spring catapulted the ball and it was often lost. The cup was unsatisfactory because in swivelling on the bearing it assumed angular positions relative to the axis of the handle causing the upper turns of the coil spring to be out of line with the body of the spring and to rub against the spiral thus producing friction.

Further friction resulted from the fact that the spring did not always turn with the handle and the spiral and thus any portion of the spring which was out of a straight line rubbed against the spiral while being compressed and expanding, and was also rubbed by the rotary movement of the portion of the spiral in contact with it.

In the prior art device the lower coils of the spring which extended beyond the lower end of the spiral when in expanded position struck against the lower end of the spiral as the spring was compressed thus making an undesirable clicking noise while causing fouling friction and wear. In the device disclosed herein the spring is modified, thereby successfully eliminating fouling and the clicking noise, and maintained in axial alignment thus materially reducing friction between the spring and the spiral member, as will now be explained.

The lower portion 10a of handle 10 is tapered and the lower end of spring 18 is formed with a number of "dead" turns permanently pressed together forming a rigid spacing member 38 which is wedged within the tapering space provided within the handle portion 10a and thus aids in the elimination of friction by causing the spring to rotate in unison with the handle and spiral member 16 while it is alternately being compressed and expanding axially of the handle and spiral member.

The spacing means 38 at the lower end of spring 18 thus coacts with the bearing member 22 at the upper end of the spring, and with the concavity 24 in the lower end of the head portion 26 of plunger 28, to provide rotation of the spring in unison with the spiral member 16 and the handle 10 around an axis which is a prolongation of the axis of the reciprocating but non-rotating plunger.

An annular bushing 40 is provided to close the top of the handle 10 by being press fitted therein or threadedly engaged therein. Plunger 28 reciprocates through bushing 40 which, in cooperation with the plunger head 26 and a portion of the plunger 28 performs the dual purpose of providing a grease trap, preventing lubrication from escaping from within the tubular handle 10 above bushing 40, and a seal, preventing any liquid which may seep between plunger 28 and the top of bushing 40 from passing around or below said plunger head portion 26. The grease trap is defined between the lower part of downwardly projecting tubular portion 42 of bushing 40, which is of greater internal diameter than the upper part 41 of said tubular projection, and the portion 28a of the plunger which is of reduced diameter, and extends from the plunger head 26 to the shoulder 29.

The lower extremity of tubular portion 42 is chamferred both on its inner and its outer surface. The inner chamfer 44 is adapted to mate with a complementary chamfer 46 at the upper end of the plunger head 26, whereby, when bushing 40 is seated within the upper end of subular handle 10, a liquid seal is provided at the point of contact between the oppositely inclined and complementary faces 44 and 46.

The chamfer 48 on the outer surface of member 42 provides a lead facilitating insertion of the bushing member within the upper end of tubular handle 10.

There is thus provided a device of the kind described the portion thereof which will be inserted in the liquid or other material to be mixed or whipped will be entirely sealed, thus preventing any contact of the liquid or other material with operating parts which are within handle 10. The upper end of tubular member 10 and the bushing 40 will not ordinarily be submerged in use, but may be submerged in liquid as for example in a dish pan or washing machinery, at which time the plunger will be drawn out to its upper most position. Any liquid which may seep between the top portion of bushing 40 and the main body portion of plunger 28 will be caught within the space defined between the reduced portion 28a of the plunger and tubular portion 42 of the bushing and prevented from penetrating below the top of the plunger head 26 by the seal provided between the chamferred edges 44 and 46 on the lower end of tubular portion 42 of the bushing and on the upper end of plunger head 26 respectively.

Any grease moving upward from the lubricated inner surface of the spiral will likewise be trapped in the space defined between the portion 28a of plunger 28 and the lower portion 42 of the tubular flange 40, and since the volume of grease finding its way into this space will be very small in volume and will not be subjected to any pressure tending to force it out of said space, there is no tendency for it to travel upward between the top of bushing 40 and plunger 28, and in operation of the device it does not do so. When the plunger is depressed, and plunger head 26 is separated from contact with bushing 40, any grease collected in said space is then free to work down between the plunger head 26 and spiral 16 where it is employed in reducing friction between the stationary spiral member 16, and the reciprocating plunger head 26 and spring 18.

The cage or cup 20 formed by the compressed and "dead" upper turns of spring member 18 hold the bearing member 22 in such a way as to provide a universal joint between said member 22 and the recess 24 in the lower end of member 26, without any tendency of the upper portion of the spring to buckle or become angularly related to the remainder of the spring and thus cause frictional contact between the means for holding the bearing member 22 and the surrounding parts. The area of contact between bearing member 22 and the small area of the lower face of the plunger head 26 with which it contacts is very small and the spring rotates relative to the plunger head with a minimum of friction. Friction between the upper end of the spring and the surrounding spiral member is eliminated as described above and striking of "live" coils at the lower end of the spring against the lower end of said spiral member is eliminated by the provision of the cylindrical spacing means 38 formed as described above and which by wedging within tapered lower end of handle 10 causes the spring to rotate with the spiral 16 and the spoon handle 10 and bowl 12 on the contact point 36.

There has thus been provided by this invention a method and an article in which the various objects hereinabove set forth together with many thoroughly practical advantages are successfully achieved. As various possible embodiments might be made of the above invention and the art herein described might be varied in various parts, all without departing from the scope of the invention, it is understood that all matter hereinbefore set forth is to be interpreted as illustrative and not in a limiting sense.

What I claim is:

1. A mixing device of the kind described comprising a tubular member with a spiral track therein, the lower portion of the tubular member being tapered, and a plunger reciprocal within said tubular member including a head portion having projecting means thereon for travelling in said spiral track, and a coil spring extending axially of the spiral track between the lower end of the tubular member and the said plunger, the lower end of the coil spring being formed with a number of dead turns permanently pressed together forming a rigid spacing member which is wedged within the tapered lower end of said tubular member.

2. A mixing device of the kind described comprising a tubular member with a spiral track therein, a plunger reciprocal within said tubular member including a head portion having a concavity in its lower face and projecting means thereon for travelling in said spiral track, and a coil spring extending axially of the spiral track between the lower end of the tubular member and the said plunger, the lower portion of said tubular member being tapered, and the lower end of said coil spring being formed with a number of dead turns permanently pressed together forming a rigid spacing member which is wedged within the tapered lower end of said tubular member, the upper end of said coil spring being defined by a number of dead turns permanently pressed together, and a bearing member seated within the cage provided by said upper turns of the coil spring and projecting above said spring for contact with the concave portion of the lower face of said plunger head.

References Cited in the file of this patent

UNITED STATES PATENTS

| | | |
|---|---|---|
| 917,770 | Knudsen | Apr. 13, 1909 |
| 1,194,901 | Truman | Aug. 15, 1916 |
| 1,573,981 | Maanum | Feb. 23, 1926 |
| 1,960,089 | Rabb | May 22, 1934 |
| 2,026,007 | White | Dec. 31, 1935 |
| 2,111,407 | Rommel | Mar. 15, 1938 |
| 2,484,391 | Treiss | Oct. 11, 1949 |
| 2,571,500 | Trevaskis | Oct. 16, 1951 |
| 2,636,393 | Josephs | Apr. 28, 1953 |
| 2,677,561 | Mueller | May 4, 1954 |
| 2,699,179 | Hausen et al. | Jan. 11, 1955 |

FOREIGN PATENTS

| | | |
|---|---|---|
| 292,427 | Italy | Jan. 18, 1932 |
| 374,135 | Italy | Aug. 16, 1939 |